United States Patent [19]

McGuire

[11] Patent Number: 5,125,615
[45] Date of Patent: Jun. 30, 1992

[54] MOUNTING DEVICE FOR FISHING ACCESSORIES

[76] Inventor: Scott McGuire, R.D. #1 Box 149, Westerlo, N.Y. 12193

[21] Appl. No.: 637,673

[22] Filed: Jan. 7, 1991

[51] Int. Cl.$^5$ ............................................. F16M 13/00
[52] U.S. Cl. ................................... 248/512; 43/21.2; 248/289.1
[58] Field of Search ............... 248/538, 514, 512, 515, 248/539, 289.1; 43/21.2, 27.4; 114/343, 364

[56] References Cited

U.S. PATENT DOCUMENTS

| | | | |
|---|---|---|---|
| 2,184,583 | 12/1939 | Danko | 43/21.2 X |
| 2,671,231 | 3/1954 | Massicotte | 114/343 X |
| 2,851,234 | 9/1958 | Scheifele | 248/538 |
| 3,444,643 | 5/1969 | Dobbs | 43/21.2 X |
| 4,014,127 | 3/1977 | Turner | 43/27.4 |
| 4,124,190 | 11/1978 | Wheeler | 248/538 |
| 4,586,688 | 5/1986 | Hartman | 43/21.2 X |
| 4,836,127 | 6/1989 | Wille | 114/343 |

Primary Examiner—J. Franklin Foss
Attorney, Agent, or Firm—Abdallah & Muckelroy

[57] ABSTRACT

A boat mounting device for fishing accessories. The device includes a boat attachment bracket and a fishing accessory bracket. The fishing accessory bracket is rotatably receivable in the boat attachment bracket in a manner permitting 360° lateral rotation of the fishing accessory bracket relative to the boat attachment bracket.

16 Claims, 3 Drawing Sheets

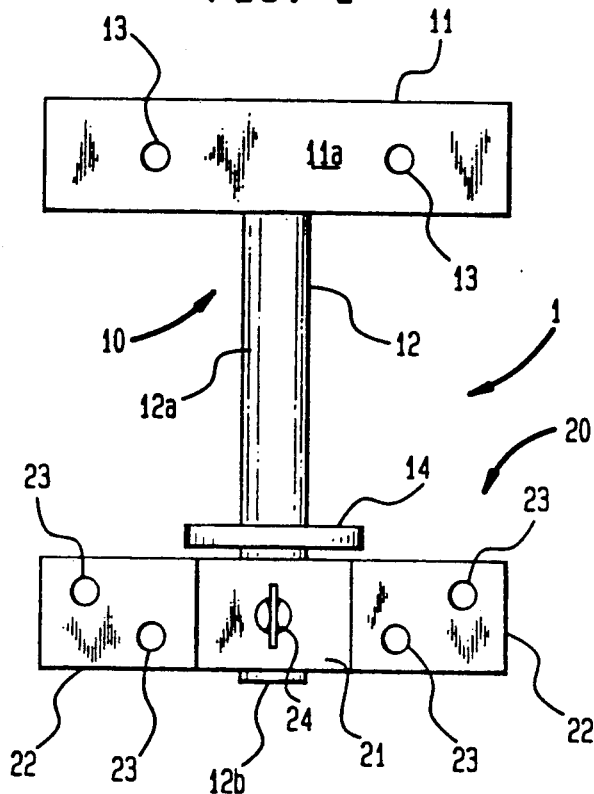
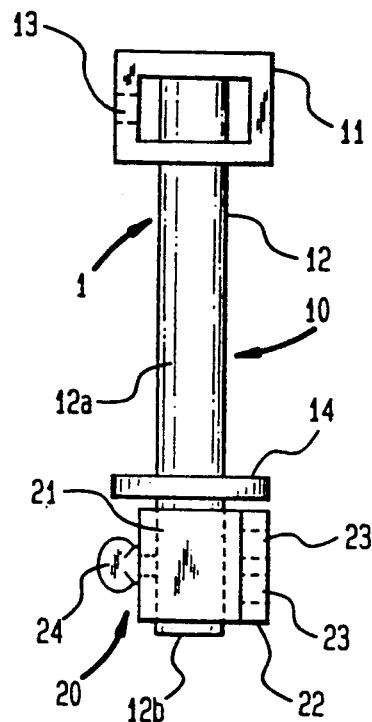
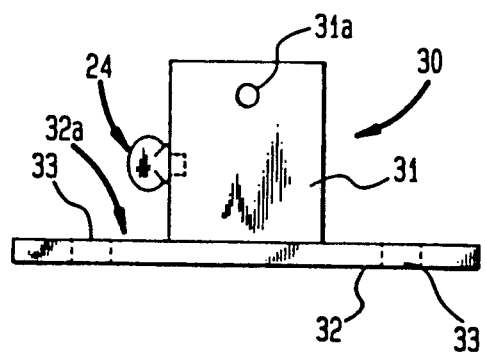
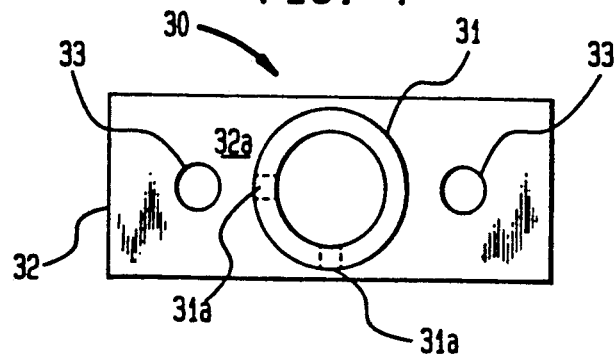

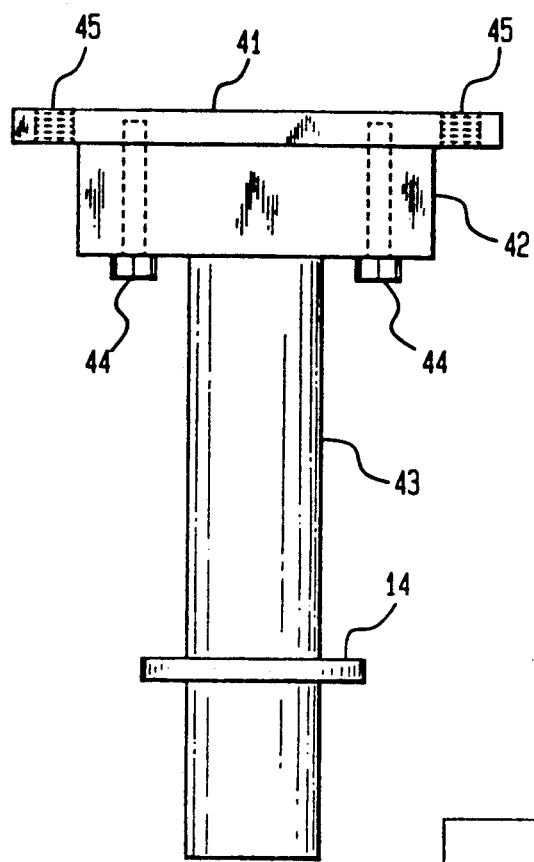
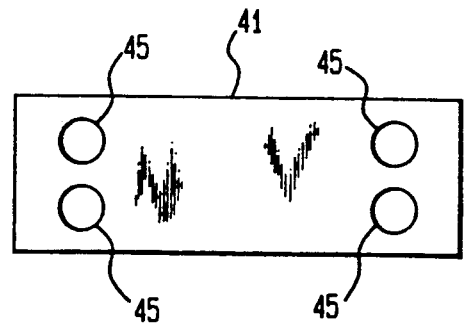
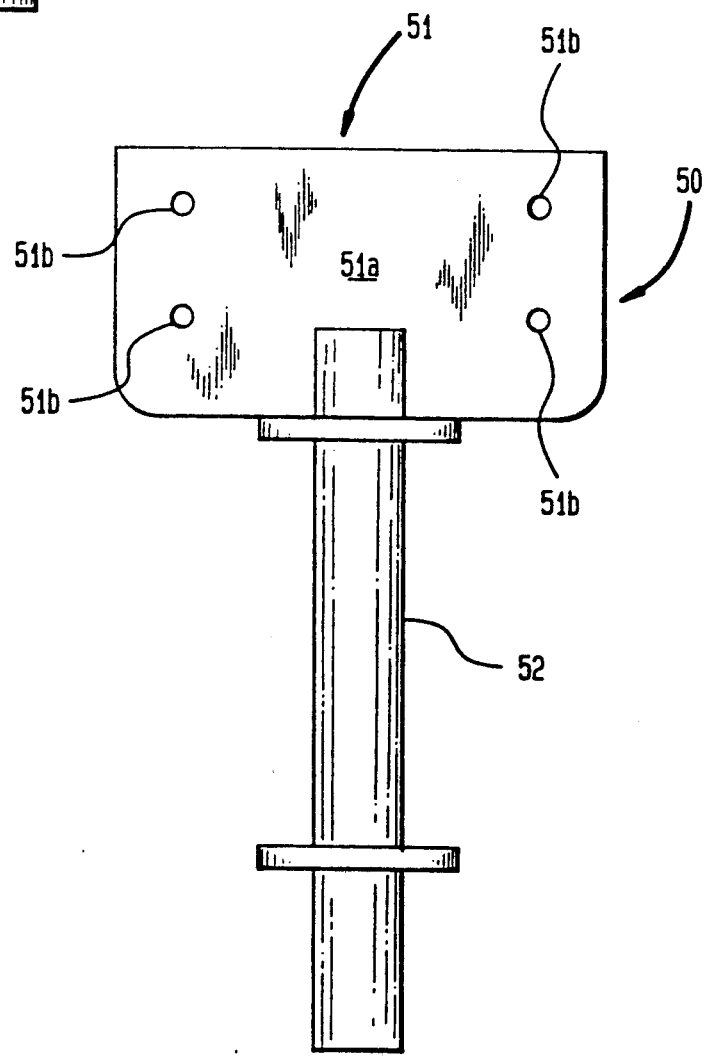

MOUNTING DEVICE FOR FISHING ACCESSORIES

BACKGROUND OF THE INVENTION

The present invention generally relates to devices for mounting fishing accessories to a boat. More specifically, this invention relates to fishing accessory boat mounting means which permit fishing accessories to be rotated laterally.

Fishing accessories include rod holders, fish finders, lanterns, nets, etc. Exemplary rod holders of the prior art are disclosed in U.S. Pat. Nos. 4,836,127; 4,716,674; 2,446,282; 2,426,881; 1,963,463; and 1,520,543. U.S. Pat. No. 1,532,367 discloses a device for mounting a net to a boat. U.S. Pat. Nos. 4,637,492 and 3,843,082 disclose boat mounting means for a lantern or light. U.S. Pat. No. 4,681,219 discloses boat mounting means for storage containers.

Fishing accessories are generally designed to be connected directly to a boat. Rod holders, for example, are shown in the prior to be attachable to a boat by clamping means or bolt means. The rigid attachment means of the prior art fishing accessories generally prevents a fishing accessory from being rotated 360° laterally. The prior art mounting means for fishing accessories are also generally not universally adaptable to different boat rail widths and to boats having different hull sweeps. Thus, when a rod holder, for example, is used at different locations on a boat or on differently-structured boats the rod holder must be readjusted each time that it is moved.

A further problem with the prior art boat mounting means for fishing accessories, particularly pertinent for bolt-on type fishing accessories, is the potential for damage or theft when a boat is stored or otherwise not in use. Fishing accessories can be expensive. A fixedly attached fishing accessory is generally left on a boat when stored. These expensive items may then be removed while the boat is stored or docked in a remote location.

SUMMARY OF THE INVENTION

The device for mounting fishing accessories to a boat of the present invention generally comprises, in a first embodiment, a boat attachment bracket fixedly attachable to a boat and a T-shaped fishing accessory bracket having a stem rotatably receivable in the boat attachment bracket. The fishing accessory bracket can be locked at selective lateral dispositions by means of a winged bearing screw disposed in the boat attachment bracket which engages the stem of the fishing accessory bracket.

The device of the present invention is essentially a holder for a rod holder or other fishing accessory. Instead of mounting a fishing accessory directly to a boat the present invention provides boat attachment means for fishing accessories that permits universal adaptation of the fishing accessory to boats of different structure and to different locations on a boat. The mounting device of the present invention eliminates the need for readjustment of a rod holder each time that it is relocated.

Another object of this invention is to provide a boat mounting device for fishing accessories that permits 360° lateral rotation of the fishing accessory.

A further object of this invention is to provide a mounting device which permits easy removal of expensive fishing accessories when a boat is stored or not otherwise in use.

A still further object of the present invention is to provide boat mounting means adaptable to a variety of fishing accessories.

These and other objects and advantages of the present invention will be apparent to those skilled in the art from the following description of preferred embodiments, claims and appended drawings.

BRIEF DESCRIPTION OF THE DRAWINGS

FIG. 1 ia a front elevational view of a first embodiment of the mounting device of the present invention.

FIG. 2 is a side elevational view of the first embodiment.

FIG. 3 is a front elevational view of a second embodiment of a boat attachment bracket constructed in accordance with the teachings of the present disclosure.

FIG. 4 is a top plan view of the boat attachment bracket shown in FIG. 3.

FIG. 5 is a front elevational view of a second embodiment of a fishing accessory bracket constructed in accordance with the teachings of the present disclosure.

FIG. 6 is a top plan view of the fishing accessory bracket shown in FIG. 5.

FIG. 7 is a side elevational view of a third embodiment of a fishing accessory bracket constructed in accordance with the teachings of the present disclosure.

DETAILED DESCRIPTION OF PREFERRED EMBODIMENTS

Figure 8:
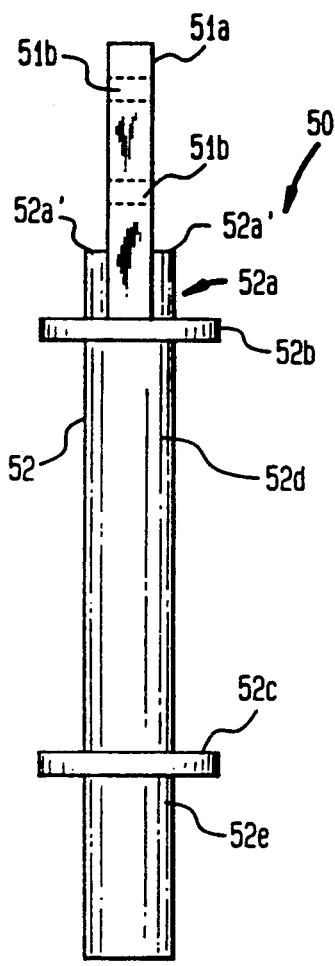
FIG. 8 is an end elevational view of the fishing accessory bracket shown in FIG. 7.

Fishing accessories generally attach to a boat by clamping means or by bolting means. The attachment means may be adapted for attachment to a vertical surface or a horizontal surface. FIG. 1 illustrates a first embodiment of the boat mounting device 1 of the present invention. First boat mounting device 1 provides means for receipt of clamp-on type fishing accessories and is attachable to the side of a boat or like substantially vertical wall. First boat mounting device 1 generally comprises a T-shaped clamp-on accessory bracket 10 and a vertical wall attachment bracket 20. Clamp-on accessory bracket 10 is rotatably receivable in vertical wall attachment bracket 20. Clamp-on accessory bracket 10 includes a clamp-on accessory bracket head 11, preferably a length of 1" square aluminum tubing, and a clamp-on accessory bracket stem 12, preferably a length of ½" round aluminum bar stock. Clamp-on bracket stem 12 is fixedly attached to and extends orthogonally from the clamp-on accessory bracket head 11. Clamp-on accessory bracket head 11 provides a body for clamping engagement of any clamp-on type of fishing accessory, such as a Cannon Mini Troll ®, a Down Each ® double or single clamp, TiteLok ® rod holders, or portable bow and stern lights, for examples.

The clamp-on accessory bracket head 11 includes a pair of threaded openings 13 disposed in spaced relationship in a side wall 11a of the bracket head 11 for conversion of clamp-on accessory bracket head 11 to a bolt-on type accessory bracket head as hereinafter described in greater detail. Clamp-on accessory bracket stem 12 is preferably formed having a stem bearing plate 14 fixedly attached annularly about the stem 12 separating the stem 12 into an upper stem portion 12a and a lower stem portion 12b. The stem bearing plate is preferably a ⅛" aluminum washer having a 1¼" O.D. The lower stem portion 12b is the part of stem 12 received in rotatable engagement with the vertical wall attachment bracket 20. Stem bearing plate 14 is thereby disposed in bearing relationship with the top surface of a portion of the vertical wall attachment bracket 20.

Vertical wall attachment bracket 20 is preferably formed from aluminum and includes a centrally-disposed stem receptacle 21 and a pair of integrally-formed attachment flanges 22 extending laterally from opposing sides of the stem receptacle 21. Bolt or screw holes 23 are formed in the respective attachment flanges 22 to facilitate attachment of the vertical wall attachment bracket 20 to a boat. A winged bearing bolt 24 threadedly engages the stem receptacle 21 to provide hand tightening means to lock the clamp-on accessory bracket in a selected position (FIG. 2).

First mounting device 1 provides mounting means that permits 360° lateral rotation of fishing accessories. First mounting device 1 also provides universally adaptable mounting means for any clamp-on type fishing accessory by provision of the clamp-on accessory bracket head 11. A plurality of vertical wall attachment brackets 20 can be permanently attached to the side of a boat, for example, at various locations and various clamp-on fishing accessories can be selectively attached to the accessory bracket head 11 of a fishing accessory bracket 10. The fishing accessory bracket 10 can then be selectively placed in any of the attachment brackets 20 as desired without adjustment of the fishing accessory. Thus, a fishing rod, for example, can be attached to a rod holder at the proper angular orientation for a particular fisherman. The rod holder can then be clamped to a bracket head 11 and moved from one vertical wall attachment bracket 20 to another without having to re-adjust the rod on the rod holder.

FIGS. 3 and 4 illustrate a horizontal wall attachment bracket 30 which provides means for attachment of fishing accessories to a boat rail or other horizontal surface. Horizontal wall attachment bracket 30 includes a stem receptacle 31 fixedly attached to the top surface 32a of a horizontal bearing plate 32. Horizontal bearing plate 32 extends laterally beyond opposing sides of stem receptacle 31. Stem receptacle 31 is preferably formed from ⅞" I.D. aluminum tubing and includes one or a plurality of threaded openings 31a for selective receipt of a winged bearing bolt 24 for locking of the first accessory bracket stem 12, for example, as heretofore described. Bearing plate 32 of the horizontal wall attachment bracket 30 includes bolt or screw holes 33 disposed to each side of stem receptacle 31 (FIG. 4).

With horizontal wall attachment bracket 30 fixedly attached to a boat, the stem 12 of first accessory bracket 10 can be placed in the stem receptacle 31, the stem bearing plate 14 resting against the top surface of the stem receptacle 31.

FIG. 5 illustrates a second accessory bracket 40. Second accessory bracket 40 may be utilized with either the vertical wall attachment bracket 20 or the horizontal wall attachment bracket 30. Second accessory bracket 40 provides means for mounting a liquid crystal display, also known as a fish finder, or like horizontally based bolt-on device. Second accessory bracket 40 includes a horizontal mounting plate 41 fixedly attached to a base member 42 which is fixedly attached to a base plate stem 43. Base plate stem 43 is formed as heretofore described for first accessory bracket stem 12 having a stem bearing plate 14 disposed annularly about a lower part of base plate stem 43. Horizontal mounting plate 41 is fixedly attached to base member 42 by means of bolts 44 which extend through base member 42 and threadedly engage horizontal mounting plate 41. Threaded mounting plate bolt holes 45 are formed in mounting plate 41 which receive the mounting bolts (not shown) of the fish finder.

FIGS. 7 and 8 illustrate a bolt-on accessory bracket 50 suitable for attachment of bolt-on type fishing accessories, for example, a Fish On ® rod holder. Bolt-on accessory bracket 50 may be utilized with a vertical wall attachment bracket 20 or a horizontal wall attachment bracket 30. Bolt-on accessory bracket 50 includes a bolt-on accessory bracket head 51 and a second accessory bracket stem 52. Bolt on accessory bracket head 51 substantially comprises a flat bolt-on plate member 51a having an array of bolt holes 51b which extend transversely through the relatively narrow thickness of the plate member 51a. Plate member 51a is fixedly attached to second accessory bracket stem 52. Second accessory bracket stem 52 is preferably a cylindrical bar member and includes a forked stem end 52a which receives the flat bolt-on plate member 51a between respective prongs 52a' of the forked stem end 52a. An upper bearing plate 52b is fixedly disposed annularly about the outer surface of the second accessory bracket stem 52 adjacent a portion of the bottom surface of the plate member 51a. A lower bearing plate 52c is fixedly disposed annularly about the lower part of second accessory bracket stem 52 separating stem 52 into a medial stem portion 52d and a second lower stem portion 52e. Second lower stem portion 52e is receivable in rotatable engagement with a vertical wall attachment bracket 20 or a horizontal wall attachment bracket 30 as heretofore described.

Figure 9:
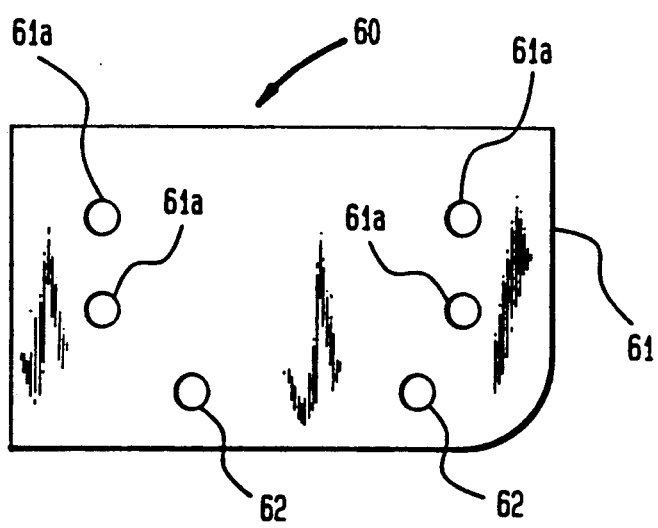
FIG. 9 is a side elevational view of a bolt-on adapter for the first fishing accessory bracket shown in FIGS. 1 and 2.

FIG. 9 illustrates a bolt-on adapter 60 which permits conversion of a clamp-on accessory bracket 10 (FIG. 1) for use with bolt-on type fishing accessories. Bolt-on adapter 60 comprises a flat adapter plate member 61 formed substantially the same as the bolt-on plate member 51a of the bolt-on accessory bracket 50. In addition to an array of bolt holes 61a similar to the bolt holes 51a of the bolt-on accessory bracket 50, adapter 60 further includes a pair of head attachment bolt holes 62 which are disposed in space relationship at an equal distance as the threaded openings 13 of the clamp-on accessory bracket head 11 (FIG. 1). Thereby, the head attachment bolt holes 62 can be aligned with the threaded openings 13 for attachment of the adapter 60 to the clamp-on accessory bracket head 11 by bolt means.

Figure 10:
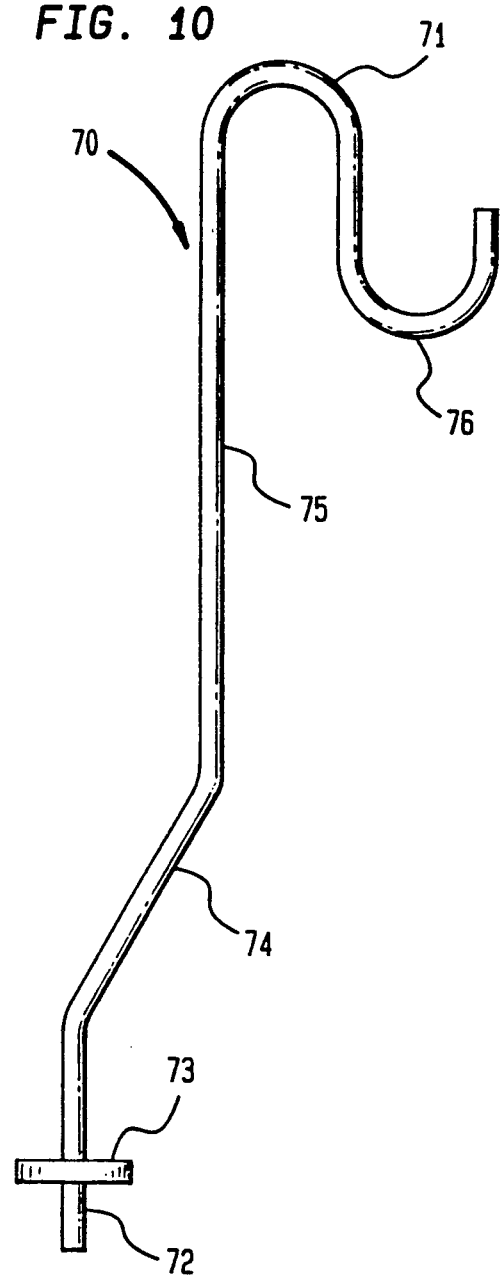
FIG. 10 is a side elevational view of a lantern attachment bracket constructed in accordance with the teachings of the present disclosure.

FIG. 10 illustrates a lantern holder 70 suitable for use with a vertical wall attachment bracket 20 or a horizontal wall attachment bracket 30. Lantern holder 70 comprises a bent tubing member 71 integrally formed with a lantern holder stem 72. A holder bearing plate 73 is disposed between the tubing member 71 and holder stem 72. Tubing member 71 is preferably formed from ⅜" O.D. stainless steel tubing and includes a 45° bend 74 which extends to a vertical shaft portion 75. A lantern holder hook portion 76 is integrally formed with the vertical shaft portion 75 for receipt of a lantern (not shown). A lantern may be hung directly on lantern holder hook portion 76 or extended downwardly therefrom by a S-hook and a chain. The disclosed construction of the lantern holder 70 permits a lantern to be disposed over the side of a boat and rotated 360° laterally in a vertical wall attachment bracket 20, for example, by the rotatable engagement of the lantern holder stem 72 therein. Thus, a lantern can be disposed over the side of a boat and brought within the boat for easy lighting of the lantern. As should be understood the lantern holder 70 can be locked in place by engagement of the winged bearing bolt 24 with the holder stem 72.

Various changes and modifications can be made to the present disclosure without departing from the spirit and scope of the invention. Such changes and modifications within a fair reading of the following claims are intended as part of the present disclosure.

Therefore, in view of the foregoing I claim:

1. A device for mounting fishing accessories to a boat comprising a boat attachment bracket fixedly attachable to a boat; and a fishing accessory bracket, said fishing accessory bracket comprising a T-shaped clamp-on accessory bracket having a bracket head and a bracket stem said bracket stem being fixedly attached orthogonally to said bracket head and receivable in said fishing accessory bracket in lateral rotational engagement, said bracket head providing clamping support means for a claim-on type fishing accessory; and wherein said bracket head is comprised of a length of square aluminum tubing and includes a pair of threaded openings disposed in spaced relationship in side wall of said bracket head, said threaded openings providing bolting support means for a bolt type fishing accessory, said device thereby providing alternative clamp-on and bolt-on support means for fishing accessories.

2. A device as in claim 1 wherein said bracket stem comprises a length of ⅜" round bar stock having a stem bearing plate fixedly disposed annularly about a lower portion of said bar stock, said bracket stem being fixedly attached to said bracket head at an upper end thereof, said stem bearing plate separating said bracket stem into an upper stem portion and a lower stem portion, the lower stem portion of said bracket stem being receivable in said boat attachment bracket with said stem bearing plate disposed adjacent to a top surface of said boat attachment bracket.

3. A device as in claim 2 wherein said bar stock is aluminum.

4. A device as in claim 3 wherein said stem bearing plate is a ⅜" aluminum washer having an outside diameter of 1¼".

5. A device as in claim 1 wherein said boat attachment bracket comprises a vertical wall attachment bracket having a centrally disposed stem receptacle and a pair of attachment flanges integrally formed with said stem receptacle and extending laterally from opposing sides of said stem receptacle, said attachment flanges having holes formed therein for receipt of boat fastening means, a winged bearing bolt threadedly engaging said stem receptacle in a manner permitting selective bearing engagement of said bearing bolt with said fishing accessory bracket to lock said fishing accessory bracket in a selected position.

6. A device as in claim 5 wherein said boat attachment bracket is formed from aluminum.

7. A device as in claim 1 wherein said boat attachment bracket comprises a horizontal wall attachment bracket having a stem receptacle fixedly attached to a top surface of a horizontal bearing plate, said stem receptacle being formed from a length of tubing, a winged bearing bolt threadedly engaging said stem receptacle in a manner permitting selective bearing engagement of said bearing bolt with said fishing accessory bracket to lock said fishing accessory bracket in a selected position.

8. A device as in claim 7 wherein said stem receptacle comprises a length of aluminum tubing having an inside diameter of ⅜".

9. A device for mounting fishing accessories to a boat comprising a boat attachment bracket fixedly attachable to a boat; and a bolt-on adapter comprising a plate member selective attachable to the threaded openings as in claim 1, said plate member having an array of bolt holes formed therein.

10. A device for mounting fishing accessories to a boat comprising a boat attachment bracket fixedly attachable to a boat; and a T-shaped clamp-on fishing accessory bracket having a bracket head and a bracket stem fixedly attached orthogonally to said bracket head, said bracket head comprising a length of 1" square aluminum tubing having a pair of threaded openings disposed in spaced relationship in a side wall of said bracket head, said bracket stem comprising a length of ⅜" round aluminum bar stock having a ⅜" aluminum washer having an outside diameter of 1¼" fixedly disposed annularly about a lower portion of said bracket stem separating said bracket stem into an upper stem portion and a lower stem portion, the lower stem portion of the bracket stem of said clamp-on fishing accessory bracket being rotatably receivable in said boat attachment bracket in a manner permitting 360° lateral rotation of said clamp-on fishing accessory bracket relative to said boat attachment bracket.

11. A device as in claim 10 wherein said boat attachment bracket comprises a vertical wall attachment bracket formed from aluminum having a centrally disposed stem receptacle and a pair of attachment flanges integrally formed with said stem receptacle and extending laterally from opposing sides of said stem receptacle, said attachment flanges having holes formed therein for receipt of boat fastening means, said boat attachment bracket further including a winged bearing bolt threadedly engaging said stem receptacle in a manner permitting selective bearing engagement of said bearing bolt with the lower stem portion of the bracket stem of said clamp-on fishing accessory bracket to lock said fishing accessory bracket in a selected position.

12. A device as in claim 10 wherein said boat attachment bracket comprises a horizontal wall attachment bracket having a stem receptacle fixedly attached to a top surface of a horizontal bearing plate, said stem receptacle being formed from a length of tubing, a winged bearing bolt threadedly engaging said stem receptacle in a manner permitting selective bearing engagement of said bearing bolt with said fishing accessory bracket to lock said fishing accessory bracket in a selected position.

13. A device for mounting fishing accessories to a boat comprising
- a boat attachment bracket fixedly attachable to a boat; and
- a fishing accessory bracket for horizontally based bolt-on fishing accessories comprising a horizontal mounting plate fixedly attached to a base member, said base member being fixedly attached orthogonally to a base plate stem, said base plate stem comprising length of ⅝" round aluminum bar stock having a ⅛" aluminum washer having an outside diameter of 1¼" fixedly disposed annularly about a lower portion of said bracket stem separating said bracket stem into an upper stem portion and a lower stem portion, said horizontal mounting plate being fixedly attached to base member by means of bolts which extend through base member and threadedly engage horizontal mounting plate, threaded mounting plate bolt holes being formed in horizontal mounting plate which receive mounting bolts of the horizontally based fishing accessory,
- the lower stem portion of the bracket stem being rotatably receivable in said boat attachment bracket in a manner permitting 360° lateral rotation of said fishing accessory bracket relative to said boat attachment bracket.

14. A device as in claim 13 wherein said boat attachment bracket comprises a vertical wall attachment bracket formed from aluminum having a centrally disposed stem receptacle and a pair of attachment flanges integrally formed with said stem receptacle and extending laterally from opposing sides of said stem receptacle, said attachment flanges having holes formed therein for receipt of boat fastening means, said boat attachment bracket further including a winged bearing bolt threadedly engaging said stem receptacle in a manner permitting selective bearing engagement of said bearing bolt with the lower stem portion of the bracket stem of said clamp-on fishing accessory bracket to lock said fishing accessory bracket in a selected position.

15. A device as in claim 13 wherein said boat attachment bracket comprises a horizontal wall attachment bracket having a stem receptacle fixedly attached to a top surface of a horizontal bearing plate, said stem receptacle being formed from a length of tubing, a winged bearing bolt threadedly engaging said stem receptacle in a manner permitting selective bearing engagement of said bearing bolt with said fishing accessory bracket to lock said fishing accessory bracket in a selected position.

16. A device for mounting fishing accessories to a boat comprising
- a boat attachment bracket fixedly attachable to a boat; and
- a fishing accessory bracket for attachment of bolt-on type fishing accessories comprising a bolt-on accessory bracket head substantially being a flat bolt-on plate member having an array of bolt holes extending transversely through said plate member, and a bracket stem, said plate member being fixedly attached to said bracket stem, said bracket stem comprising a cylindrical bar member that includes a forked stem end which receives the plate member between prongs of the forked stem end, an upper bearing plate being fixedly disposed annularly about an outer surface of the bracket stem adjacent a portion of said plate member, a lower bearing plate being fixedly disposed annularly about a lower part of bracket stem separating said stem into a medial stem portion and a lower stem portion, said lower stem portion being receivable in rotatable engagement with said boat attachment bracket.

* * * * *